F. W. WOOD.
ELECTRICAL SWITCH.
APPLICATION FILED AUG. 2, 1912.

1,094,691.   Patented Apr. 28, 1914.
3 SHEETS—SHEET 1.

Witnesses
H. C. Polinette
Walton Harrison

Inventor
Frank W. Wood
By
Eugene Cendman Rea
Attorney

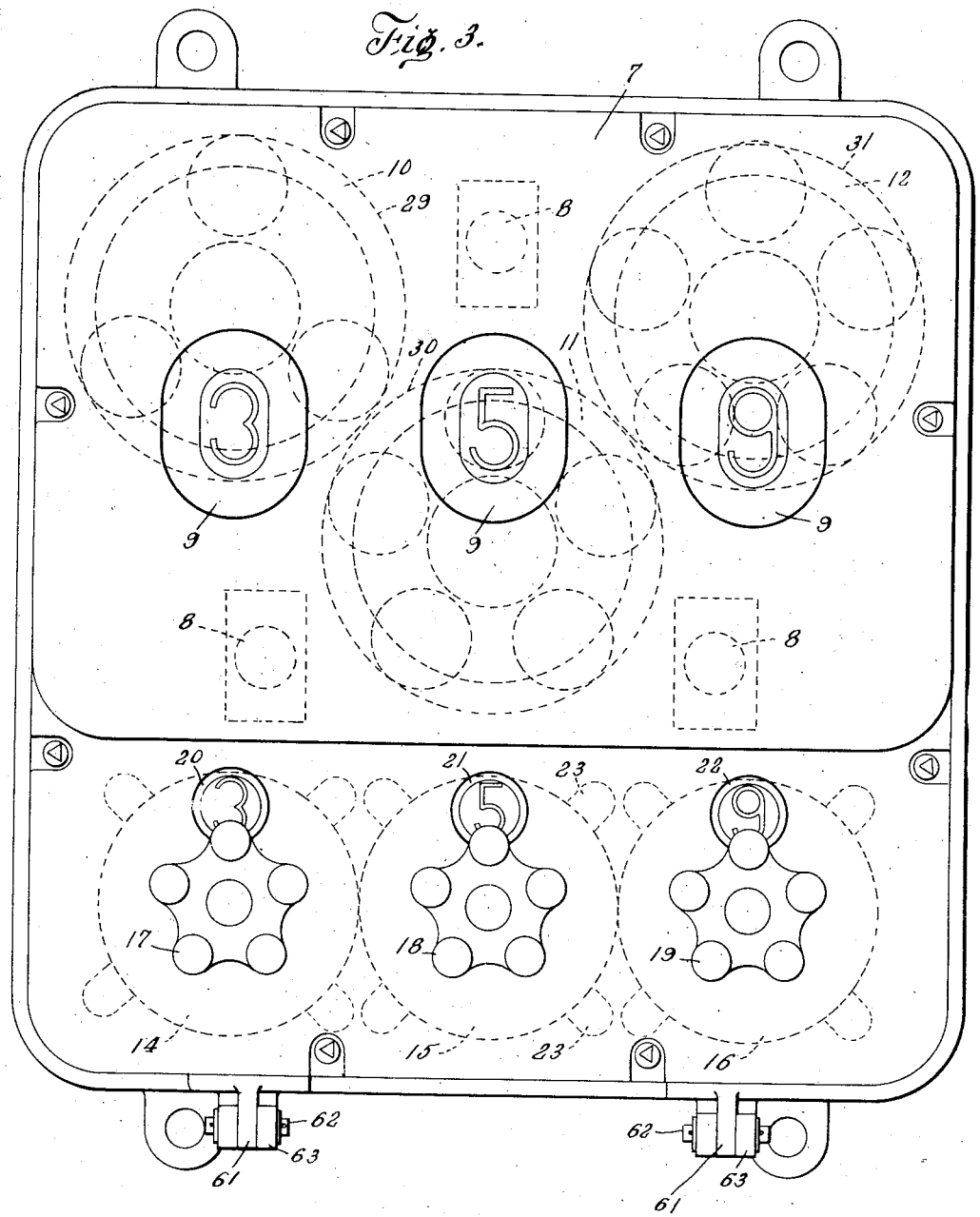

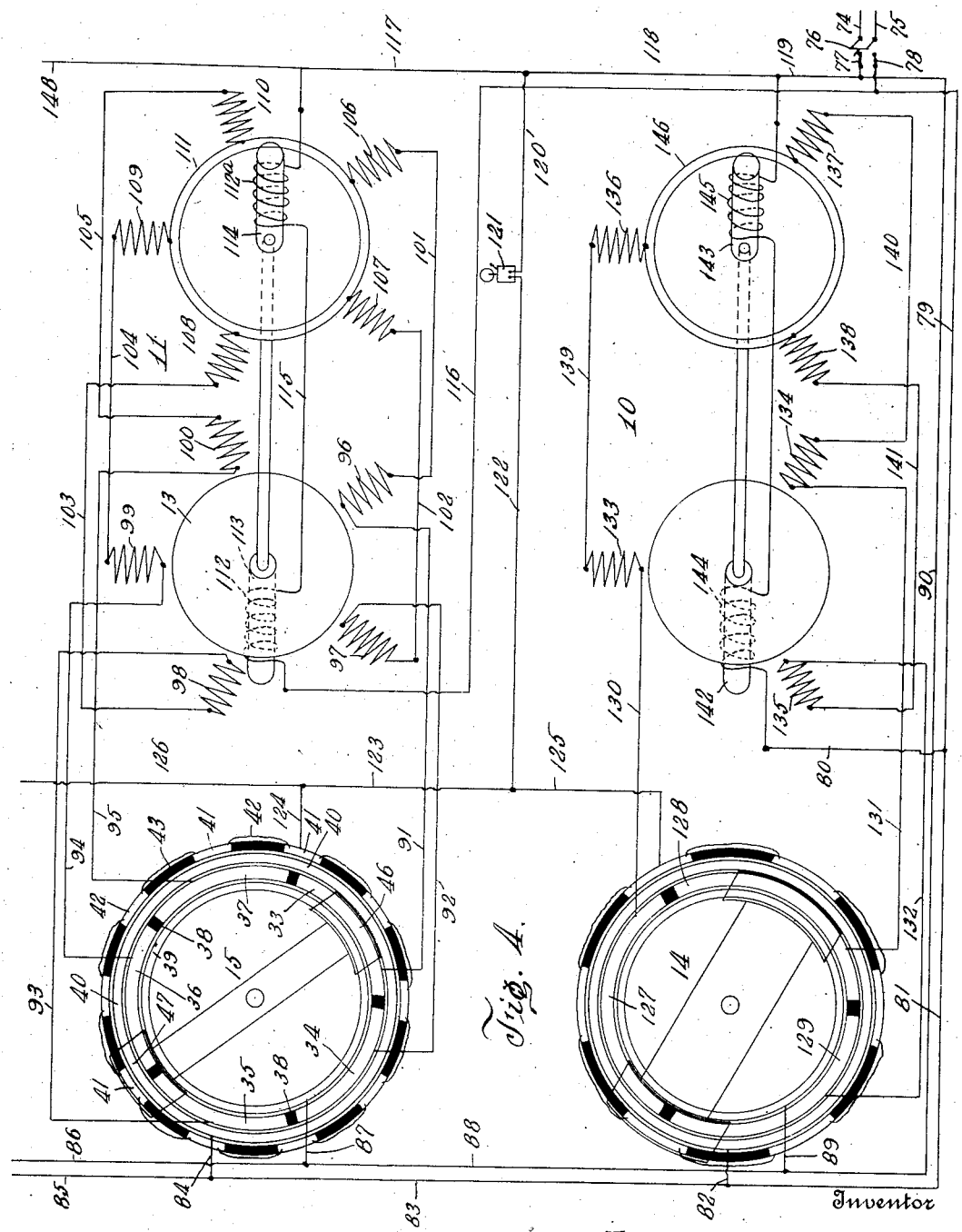

UNITED STATES PATENT OFFICE.

FRANK W. WOOD, OF NEW YORK, N. Y., ASSIGNOR, BY MESNE ASSIGNMENTS, TO CHARLES CORY & SON, INC., OF NEW YORK, N. Y., A CORPORATION OF NEW YORK.

ELECTRICAL SWITCH.

1,094,691.   Specification of Letters Patent.   Patented Apr. 28, 1914.

Application filed August 2, 1912. Serial No. 712,992.

*To all whom it may concern:*

Be it known that I, FRANK W. WOOD, a citizen of the United States, residing at New York, in the county of New York and State of New York, have invented new and useful Improvements in Electrical Switches, of which the following is a specification.

My invention relates to electrical switches suitable for general use but specially adapted for service as a part of a ship's telegraph, employed for reporting the course of the ship, the angular position of a torpedo gyroscope, or the number of revolutions per unit scope of time of a propeller shaft, or for indicating range or deflection expressed in degrees, or for transmitting certain brief battle orders.

My electric switch, as generally used in practice, serves the purpose of a transmitter unit employed in connection with an indicating unit, several transmitting units and an equal number of indicating units being placed in the same casing, there being one of these casings at each of two stations.

Each transmitting unit at either station is connected with a corresponding indicating unit at the other station so that orders may be made from one station to the other and repeated back by the station at which they are received.

Reference is to be made to the accompanying drawings forming a part of this specification, and in which like letters indicate like parts.

Figure 1:
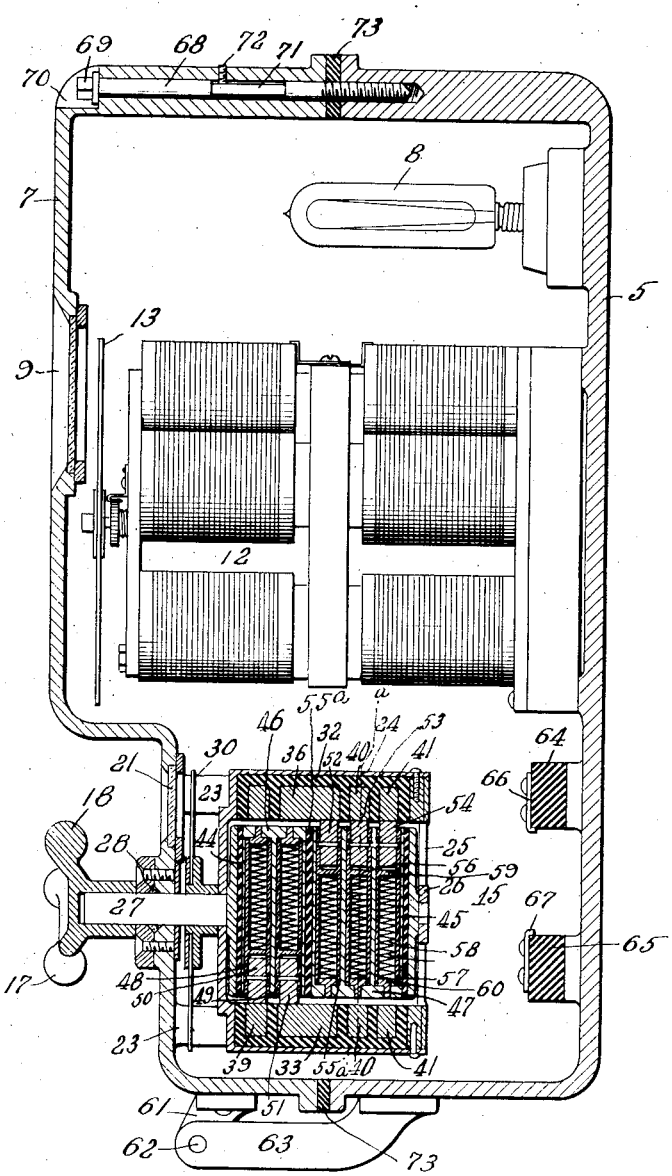
Figure 1A:
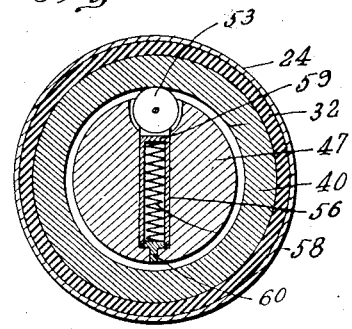
Figure 2:
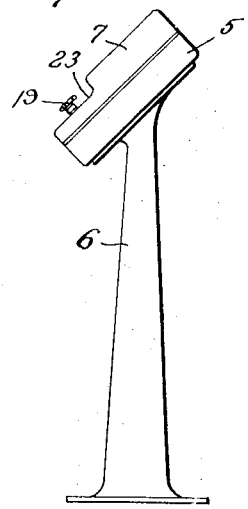

Figure 1 is a vertical section through a casing containing a number of my improved transmitter units or switches and a like number of indicating units. Fig. 1ª is a detail showing in cross section one of the switches, the section being taken on the line *a—a* of Fig. 1. Fig. 2 is a side elevation showing the casing containing switches and indicating units and a stanchion for supporting the same. Fig. 3 is a front elevation showing in full lines the casing containing several transmitting units or switches and an equal number of indicating units and in dotted lines the relative locations of said units. Fig. 4 is a fragmentary diagram of the wiring connecting two stations together.

The body of the inclosing casing for the switches and indicating units is shown at 5 and is supported in a slanting position upon the upper end of a stanchion 6, as shown in Fig. 2. Mounted upon the body portion of said casing is a cover 7. A number of lamps 8 are mounted within the casing and are used for enabling the operator to observe the indications and to see how to actuate the instrument. The casing cover 7 is provided with windows 9 through which indications may be read off. The casing may have any convenient or desired number of transmitting and indicator units. In this instance there are three indicating units 10, 11, 12 and a like number of transmitter units or switches. The indicator units need not be exactly alike, and in this instance the indicator unit 10 is provided with a smaller number of poles than either of the two indicator units 11, 12. This is due merely to the character of the intelligence to be transmitted. The particular device shown is especially adapted for transmitting or indicating a number of degrees and as the number of degrees in any circle never exceeds 360 and the numerals necessary to indicate any number of degrees can always be transmitted without requiring the use of many integers for the first of the three numerals in question. In other words, there is never any need for the indicating unit 10 to disclose a numeral higher than 3 and consequently this indicator unit may have a smaller number of polar positions than the other indicator units employed. As a consequence, the transmitter unit associated with the indicator unit 10 need not be adapted for distributing a large number of separate currents in order to actuate the indicator unit in question. Except as regards the number of poles and polar positions however, the indicator units 10, 11, 12 are alike.

Each indicator unit is provided with a revoluble dial 13 carrying a number of numerals upon its face, these numerals being visible through the windows 9, as will be understood from Fig. 3. The three transmitter units are shown at 14, 15, 16 and are severally provided with revoluble handles 17, 18, 19 whereby they are actuated. At 20, 21, 22 are windows through which observations may be made by the operator for the purpose of ascertaining the relative positions of the several transmitter units; in other words, through which the numbers being transmitted may be read off. Secured to the inner lower surface of the cover 7 are supporting legs 23, and mounted upon these is a casing 24 of cylindrical form.

This casing is provided with a rear wall 25 having generally the form of a spider and provided centrally with a bearing 26. Each handle 17, 18, 19 is mounted rigidly upon a revoluble stem 27, the latter extending through a stuffing box 28 in the cover 7 and carries a cylindrical member made of two or more parts insulated one from the other, two such parts 46, 47 being shown in Fig. 1.

Mounted rigidly upon the stem 27 is a dial 30 provided with numerals, the number of these numerals being commensurate with the purpose required. The numerals of the respective dials may be read through the windows 20, 21, 22. The cylindrical casing 24 is stationary by virtue of its connection with the legs 23. Mounted within the casing 24 is a quantity of insulation 32, and supported by aid of the latter are a number of segments 33, 34, 35, 36, 37 of conducting material, these segments being insulated from each other by small blocks 38 of insulating material. Two rings 39, 40 of conducting material are disposed upon opposite sides of the circle made up of the segments just enumerated. A number of smaller segments 41 are grouped together in the form of a circle and are connected together by wires 42 and insulated from each other by segment-shaped blocks 43 of insulating material.

Slidably mounted within the cylindrical part 46, and extending diametrically across the same are two brushes 48, 49. Revolubly mounted in the outer ends of these brushes are rollers 50, 51 of conducting material. Three other rollers 52, 53, 54 are revolubly mounted in the outer ends of three brushes 55, 56, 57, these brushes being quite similar to the others just mentioned, but extending in a diametrically opposite direction, as will be understood from Fig. 1, and are slidably mounted in the cylindrical part 47. The various brushes are each of tubular form and provided with a spring 58 and with a partition 59 against which this spring presses. Each brush is further provided with a limiting stop 60 extending radially inward from the outside of the cylinder 46 or 47, and against this stop the spring also presses. The cylinders 46, 47 are insulated from each other by a plate 55ᵃ of insulating material and from end plates on the stem 27 by insulation 44, 45, and together constitute a cylindrical member which as a whole may be turned by the corresponding handle 17, 18 or 19. The rollers 50, 51, 52, 53, 54 protrude slightly from the outer peripheral surface of this revoluble cylindrical member, which is slotted for this purpose. The rollers thus protruding are by virtue of the springs associated with them forced radially outward against the respective segments and rings adjacent to the paths of the rollers.

The handles 17, 18, 19 may be turned continuously in the same direction or may be turned in two directions as desired. Carried by the cover 7 are two brackets 61 having pivot pins 62, these pivot pins extending through brackets 63 which are secured rigidly upon the casing 5. The parts are so arranged that the cover 7 when swung open hangs from the pivot pins 62. Mounted within the casing 5 are panels 64, 65 of insulating material, and mounted upon these panels are electrical connections 66, 67 to facilitate connecting up the various conducting parts. The cover 7 is secured in position by aid of special bolts 68 provided with angular heads 69, the latter being housed in countersinks 70 and provided with reduced portions 71 to facilitate their retention upon the cover 7 by aid of retaining screws 72, as will be understood from Fig. 1. A gasket 73 is located between the casing 5 and its cover 7 for the purpose of rendering these parts water-tight.

The transmitter units here shown differ from each other only in the number of segments employed in order to adapt them for use with indicators having different numerical ranges—or in other words, different numbers of poles and polar positions. The differences between the transmitter units, due to this cause, make but little difference in the mechanical construction of the transmitter units, and the difference can best be understood by reference to the diagram shown in Fig. 4. I will now describe this diagram. Two conductors are shown at 74, 75 and may be the ship's mains or wires connected therewith. At 76 is a hand switch, and adjacent to the latter are fuses 77, 78. Connected with the fuse 78 is a wire 79, and connected with the latter are two wires 80, 81. A wire 82 leads from the wire 81 to the transmitter unit 14. Connected with the wires 81, 82 is a wire 83 which leads to a position adjacent to the transmitter unit 15 and is there connected to a wire 84 which leads to the ring 40 of this unit. Connected with the wires 83, 84 is a wire 85 which leads to the transmitter unit 16 which is not shown but is like the transmitter unit 15. A wire 86 leads also to the transmitter unit 16. Connected with the wire 86 is a wire 87 which leads to the ring 39 of the transmitter 15. A wire 88 is connected with the wires 86, 87 and also with a wire 89, the latter leading to the transmitter unit 14. The wires 88, 89 are connected to a wire 90, the latter being in communication with the fuse 77.

The segment 33 of the transmitter unit 15 is connected by a wire 91 with a magnet 96 of a corresponding indicator unit 11. Similar wires 92, 93, 94, 95 connect the several sectors 34, 35, 36 and 37 with the respective magnets 97, 98, 99, 100 of said indicator unit.

Wires 101, 102, 103, 104, 105 extend respectively from the magnets 96, 97, 98, 99, 100 to magnets 106, 107, 108, 109 and 110. The five magnets last mentioned are connected to a wire 111 having generally the form of a ring and serving to some extent the purpose of a common return wire for each and all of these magnets. At 112, 112ª are solenoids, and extending through the same are revoluble cores 113, 114. A wire 115 leads from the solenoid 112 to the solenoid 112ª and with the fuse 77. A wire 116 is connected with the solenoid 112 and with the wire 79 and fuse 78. A wire 117 is connected with the solenoid 112ª. A wire 120 is connected with the wire 117, and leads to an electric bell 121 which is for the purpose of giving an alarm. Connected with this bell is a wire 122, and connected with the latter is a wire 123. A wire 124 leads from the wire 123 to one of the segments 41 of the transmitter unit 15. A wire 125 is connected with the wires 122, 123 and leads to the transmitter unit 14. A wire 126 is connected with the wires 123, 124 and leads to the transmitter unit 16, as shown.

The transmitter unit 14 is provided with three segments 127, 128, 129, and connected with these segments respectively are wires 130, 131, 132. These wires lead respectively to magnets 133, 134, 135 of the corresponding indicator unit 10. The indicator unit 10 is provided with three other magnets 136, 137, 138, and connected with the latter are wires 139, 140, 141 leading respectively to the magnets 133, 134 and 135. The revoluble cores of the indicator unit 10 are shown at 142, 143. The solenoids of the indicator 10 are shown at 144, 145, connected by a wire 147, and at 146 is a wire connected with the magnets 136, 137, 138 and serving as a common return wire.

The operation of my device is as follows: Suppose that the operator at the transmitting station wishes to transmit a signal related to a particular number of degrees, say 359. He grasps the handle 17 (see Fig. 3) and turns it until the numeral 3 is visible through the window 20. He next grasps the handles 18, 19 and turns them until the numerals 5 and 9 are seen through the windows 21, 22. In doing this he completes various electrical circuits which may be readily traced. For the sake of clearness I will trace one of these circuits on Fig. 4, as follows: source of supply (not shown) wire 75, bottom blade of switch 76, fuse 78, wires 79, 81, 83, ring 40 of transmitter 15, brushes of cylinder 47, to segments 35 and 36; here the current divides, a portion pursuing the following course: segment 35, wire 93 to indicator 11 at receiving station magnet 98 thereof, wire 103, magnet 108, wire 111, magnet 106, wire 101, magnet 96, wire 91, segment 33 of transmitter 15, brushes of cylinder 46, ring 39, wires 87, 88, 90, fuse 77, upper blade of switch 76, wire 74, back to source of supply. The other portion of the circuit where the current divides between segments 35, 36, as above described, may be traced as follows: segment 36, wire 94, magnet 99 of said indicator 11, wire 104, magnet 109, wire 111, magnet 106, wire 101, magnet 96, wire 91, segment 33, brushes of cylinder 46, ring 39, wires 87, 88, 90, fuse 77, upper blade of switch 76 and wire 74 back to source of supply. The various magnets 98, 99, 96, 108, 109, and 106 are thus energized. Another circuit is also completed as follows: source of supply (not shown) wire 75, lower blade of switch 76, fuse 78, wire 116, solenoid 112, wire 115, solenoid 112ª, wire 117, fuse 77, upper blade of switch 76, wire 74 back to source of supply. This circuit energizes the solenoids 112 and 112ª and causes the revolution of the dial 13. The dials of the mechanism for this purpose need not be herein described as they are set forth in my copending application, Serial No. 711,378. Suffice it to say that the cores 113, 114 are adapted to turn step by step and for the purpose are provided with appropriate pole pieces which are acted upon magnetically by the various magnets in this indicator unit. Another circuit is also completed as follows: source of supply, wire 75, lower blade of switch 76, fuse 78, wires 79, 83, 84, ring 40, brushes of cylinder 47, adjacent segment 41 and other sectors 41 of the same series and wires 42, wires 124, 123, 122, bell 121, wires 120, 117, fuse 77, upper blade of switch 76 and wire 74 back to source of supply. The circuit thus traced being energized, the bell 121 is sounded. The operator at the receiving station is thus apprised that some indication is being made or is being changed; he, therefore, observes the instrument. After reading the indication he repeats it back after which the operator at the transmitting station opens his switch 76 or otherwise cuts off the current if the indication transmitted is not to be disclosed continuously.

The circuits for the indicator unit 10 and the transmitter unit 14 do not differ materially from the circuits above described with reference to the indicator unit 11 and the transmitter unit 15, with the exception that the number of circuits is smaller.

While I show a special or preferred application of my invention, I do not wish to limit myself thereby as the invention may be used in a great variety of relations and for any number of widely related purposes.

What I claim is:

1. In an electric switch, the combination of a stationary casing, a plurality of segments of conducting material mounted within said casing in circular paths and insulated from one another and from the casing, a ring of conducting material mounted within said casing and insulated therefrom and from the segments, a revoluble member within said casing formed with parallel diametrical sockets, brushes each comprising a stem slidable longitudinally in one of said sockets, a contact on the end of each stem in position to engage respectively said ring and the segments, and resilient means in said sockets tending to force the stems outwardly, and electrical connections for said ring and for each segment.

2. In an electric switch, the combination of a stationary casing, a pair of continuous conducting rings mounted in said casing and insulated therefrom and from each other, a plurality of segments of conducting material arranged in circular paths within said casing and insulated therefrom and from one another, a revoluble member extending into said casing made of a number of cylindrical parts insulated one from the other, each of said parts being formed with a plurality of diametrical sockets, a brush slidable in each socket comprising a stem, a roller on its outer end, and a spring in each socket, said springs holding the rollers in contact with the respective conducting rings and circular group of segments, and electrical connections for said rings and segments.

3. In an electrical switch, the combination of a casing of substantially cylindrical form, segments and conducting rings mounted therein and insulated therefrom and from one another, a revoluble member mounted within said casing and provided with means whereby it may be turned, said member including a number of cylindrical parts of conducting material arranged in axial line insulated one from the other and from other parts of said member in each of which said cylindrical parts are formed a plurality of diametrical sockets open at one end only through the side of each member, the sockets of the several parts opening at different points in the periphery of said member, a brush in each socket comprising a hollow stem, a roller on its outer end and a spring in the hollow of each stem, said springs forcing the roller outwardly into contact with the respective conducting rings and segments, and electrical connections for said rings and segments.

4. In an electric switch the combination with a stationary casing, a pair of continuous conducting rings mounted in said casing and insulated therefrom and from each other, a plurality of segments of conducting material arranged in circular paths within said casing and insulated therefrom and from one another, a revoluble member extending into said casing comprising two circular end plates and two cylindrical parts insulated from each other and from said end plates, each of said cylindrical parts being formed with a plurality of parallel diametrical sockets, the sockets of one part opening through the sides of the revoluble member opposite those in the other part, a brush slidable in each of said sockets comprising a stem, a contact roller on its outer end and a spring forcing said brush outwardly, electrical connection between the brushes in each circular part, and electrical connections for said rings and segments.

In testimony whereof I have hereunto set my hand in presence of two subscribing witnesses.

FRANK W. WOOD.

Witnesses:
  FRANK L. NOVAK,
  OSWALD HOUGHLAND.